N. Peck.
Earth Scraper.
Nº 85,609. Patented Jan. 5, 1869.
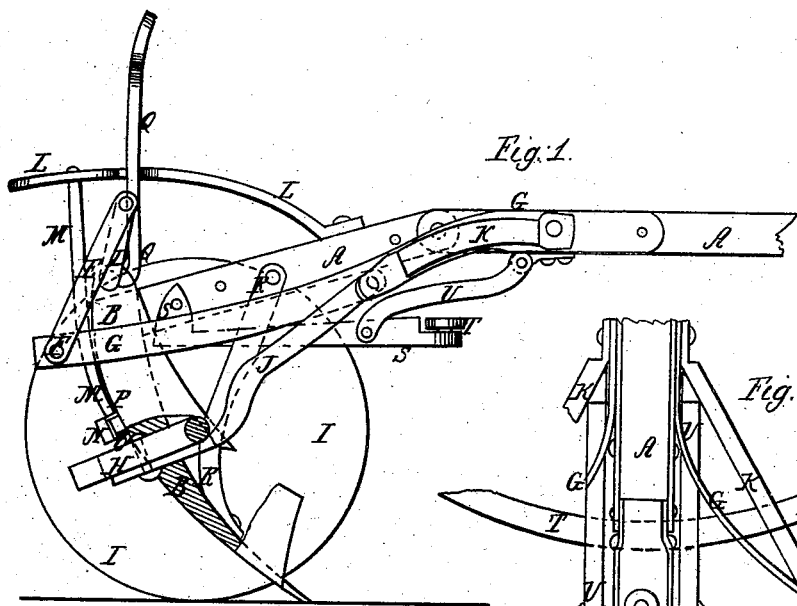
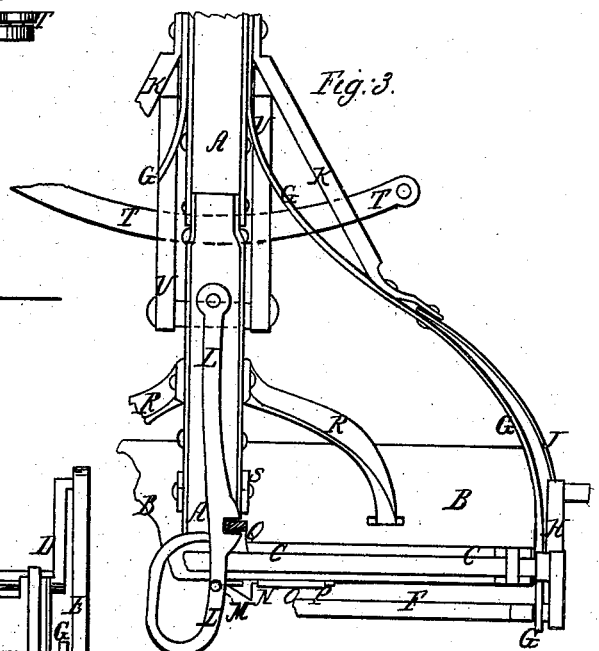
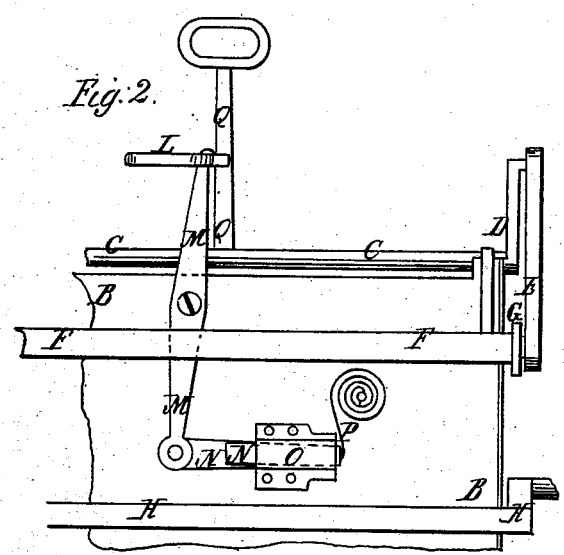
Witnesses:
Jos. Becker
Wm. Morgan
Inventor:
N. Peck.
pr. Munn
Attorneys

UNITED STATES PATENT OFFICE.

NELSON PECK, OF JAY, NEW YORK.

Letters Patent No. 85,609, dated January 5, 1869.

IMPROVED EARTH-SCRAPER.

The Schedule referred to in these Letters Patent and making part of the same.

*To all whom it may concern:*

Be it known that I, NELSON PECK, of Jay, in the county of Essex, and State of New York, have invented a new and improved Earth-Scraper; and I do hereby declare that the following is a full, clear, and exact description thereof, which will enable those skilled in the art to make and use the same, reference being had to the accompanying drawings, forming part of this specification, in which—

Figure 1 is a side view of my improved scraper, part being broken away to show the construction.

Figure 2 is a detail rear view of the same.

Figure 3 is a detail top view of the same.

Similar letters of reference indicate corresponding parts.

My invention has for its object to improve the construction of my improved scraper, patented September 4, 1866, and numbered 57,757, so as to simplify its construction, and make it more convenient and effective in use; and It consists in the construction and combination of various parts, as hereinafter more fully described.

A is the tongue, which is made in two parts, pivoted or jointed to each other, and to the rear end of which the scoop B of the scraper is securely attached.

C is a shaft running along the upper edge of the scoop B, to which it is securely pivoted, and upon the ends of which shaft are formed, or to them are rigidly secured, the crank-arms D.

To the free ends of the cranks D are pivoted the upper ends of the connecting-bars E, the lower ends of which are pivoted to the ends of the shaft F, which is securely attached to the rear ends of the brace or draught-bars G, and which, when the scoop B is raised, rest upon the axle H.

The bars G pass around the ends of the scoop B, and their forward ends are attached to the side of the tongue A, in front of the joint in said tongue.

The axle H is bent twice at right angles, near its ends, so that it may pass along the rear side of the scoop B, and upon its journals revolve the wheels I in the ordinary manner.

To the elbows of the axle H are securely and rigidly attached the rear ends of the bars J, which extend along the outer sides of the bars G, and their forward ends are pivoted to the rear ends of the bars K, which are attached to the said bars G, and the forward ends of which are attached to the sides of the tongue A, in front of the point at which the bars G are attached to said tongue.

This construction allows the scoop B to be raised and lowered without disturbing the position of the wheels and axle.

L is a lever-catch, the forward end of which is pivoted to the tongue A, in the rear of the joint in said tongue.

To the rear part of the lever L is attached the upper end of the lever M, which is pivoted to the rear side of the scoop B, and the lower end of which is pivoted to the spring-catch N, which works in a keeper, O, attached to the rear side of the scoop B, and which is held forward by the spring P, or its equivalent.

To the middle part of the shaft C is securely and rigidly attached the end of the lever Q, in such a position that when turned up into the position shown in figs. 1, 2, and 3, so as to catch upon the catch of the catch-lever L, the scoop B will be lowered into and held in a working-position.

By turning the lever Q down along the rear side of the scoop B, the said scoop will be raised from the ground, discharging the load, and, by catching the said lever Q upon the spring-catch N, the scoop will be held away from the ground, allowing the scraper to be conveniently drawn back to the place of loading, or from place to place.

The scoop B is strengthened against the draught-strain by the braces R, the lower ends of which are attached to the lower part of the forward side of the said scoop B, and the upper ends of which are attached to the tongue A, in the rear of the joint in said tongue.

S is the draught-bar, the rear end of which is pivoted to the under side of the rear part of the tongue A, just in front of the scoop B, and to its forward end is attached the double-tree T, in the ordinary manner.

The forward part of the draught-bar S is connected with the tongue A by the bars U, the rear ends of which are pivoted to the said draught-bar S, and the forward ends of which are pivoted to the said tongue A, in front of the joint in said tongue, so that the draught may always be in the same line, whether the scoop B is raised or lowered.

If desired, the axle H, and the bars J, attached to the axle, and extending along the outside of the bars G, may be dispensed with, and axle-tree arms substituted therefor, which are to be securely fastened to the bars G, in the same position with relation to the ends of the scoop now occupied by the axle. Upon these axle-arms the wheels revolve freely.

I claim as new, and desire to secure by Letters Patent—

1. The combination of the lever Q, shaft C, crank-arms D, connecting-bars E, shaft F, and bars G, with each other, with the scoop B and jointed tongue A, substantially as herein shown and described, and for the purpose set forth.

2. The combination of the catch-lever L, lever M, and spring-catch N, with each other, and with the tongue A, scoop B, and lever Q, substantially as herein shown and described, and for the purpose set forth.

3. The combination and arrangement of the axle H, pivoted bars J, and stationary bars K, with each other, and with the scoop B and bars G, substantially in the manner herein shown and described, and for the purpose set forth.

4. Connecting the draught-bar S with the tongue A, upon both sides of the joint in said tongue, substantially as herein shown and described, and for the purpose set forth.

NELSON × PECK.
his mark.

Witnesses:
E. S. PURMORT,
G. A. EVEREST.